Jan. 14, 1930.  S. E. ALLEY ET AL  1,743,514
STEAM DRIVEN VEHICLE
Filed April 7, 1928  5 Sheets-Sheet 2
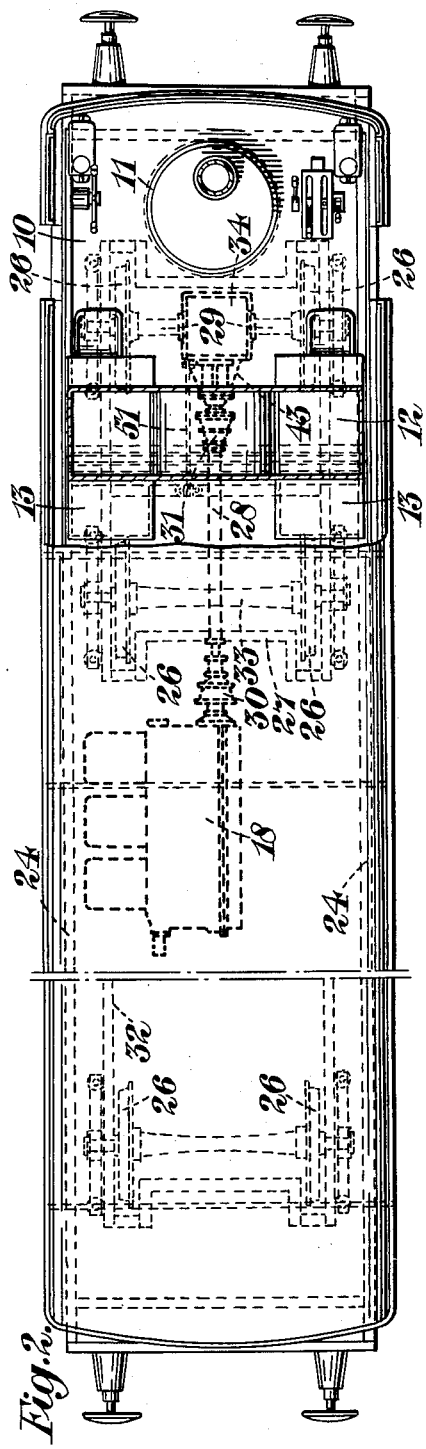
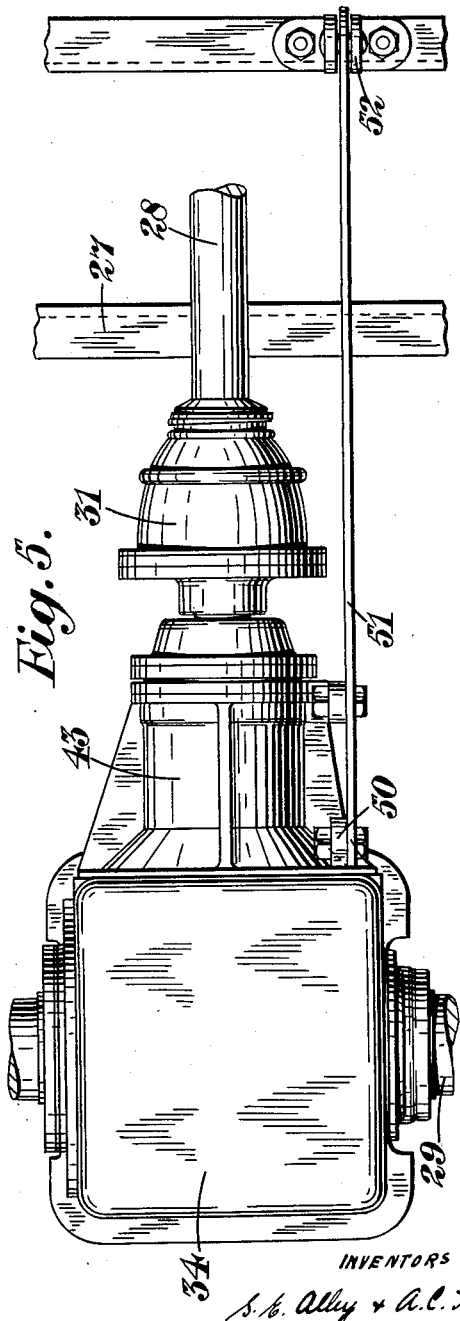
INVENTORS
S. E. Alley & A. C. Hutt
By Watson, Coit, Morse & Grindle
ATT'Ys

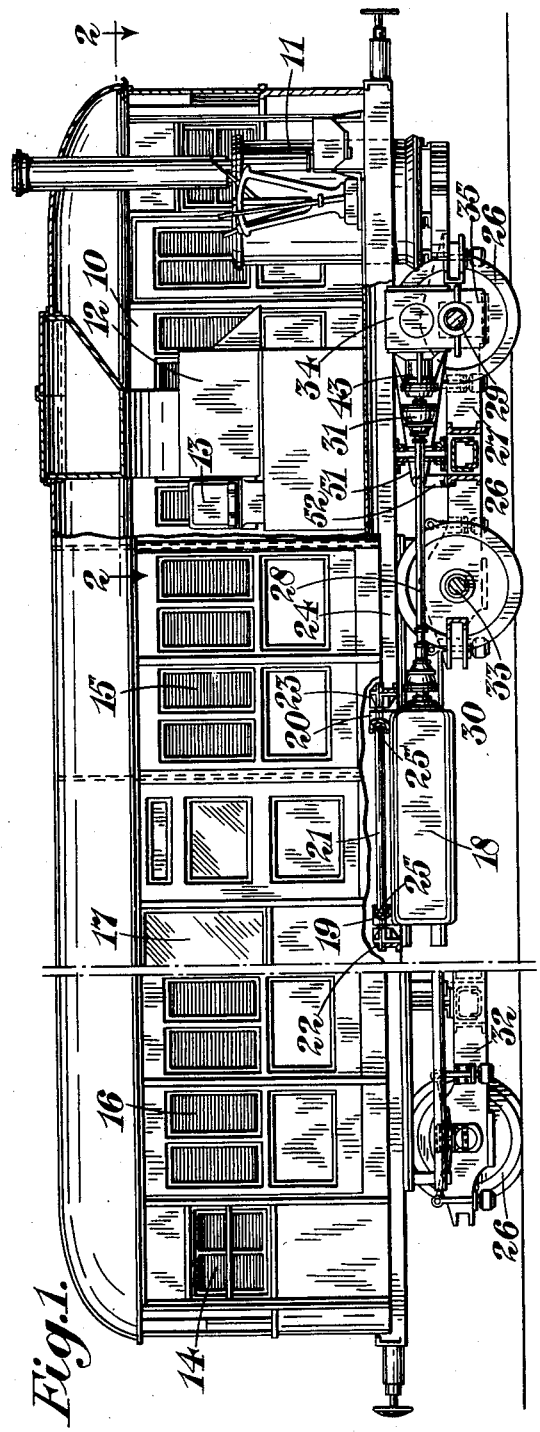

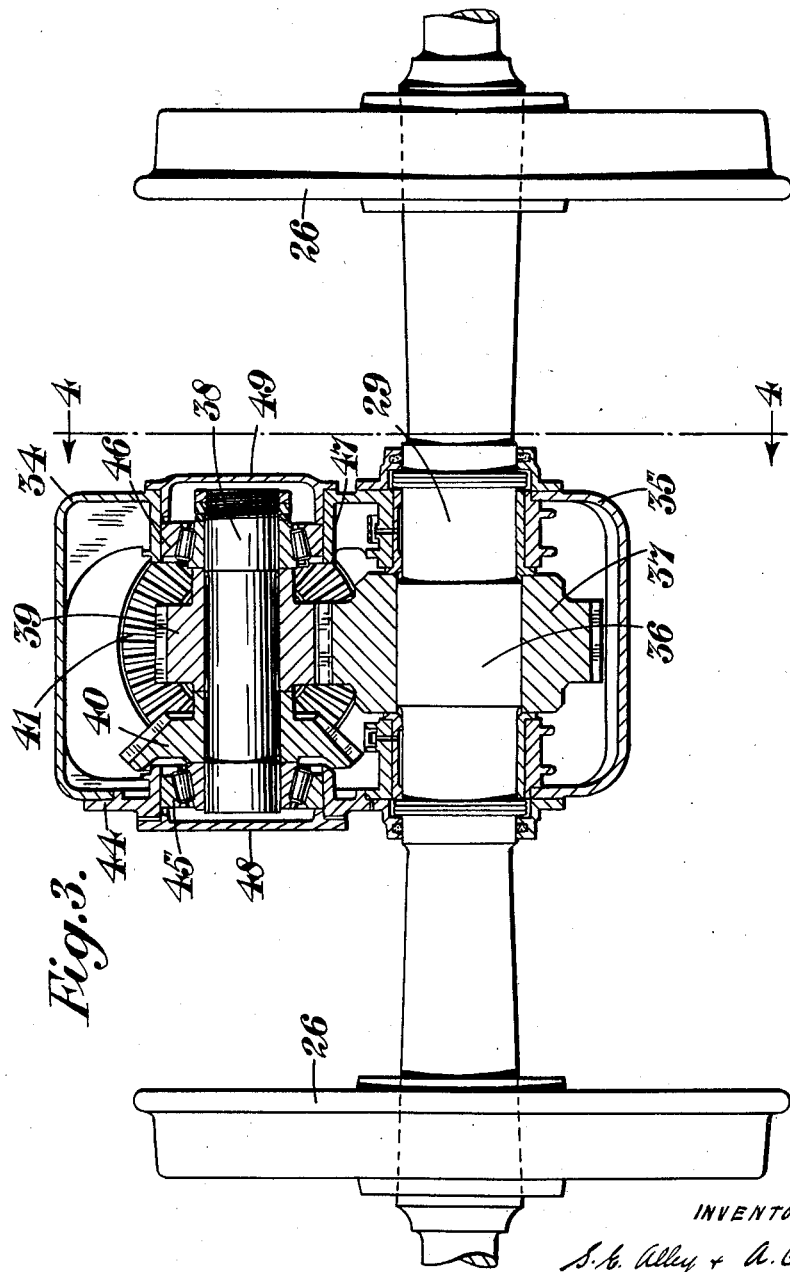

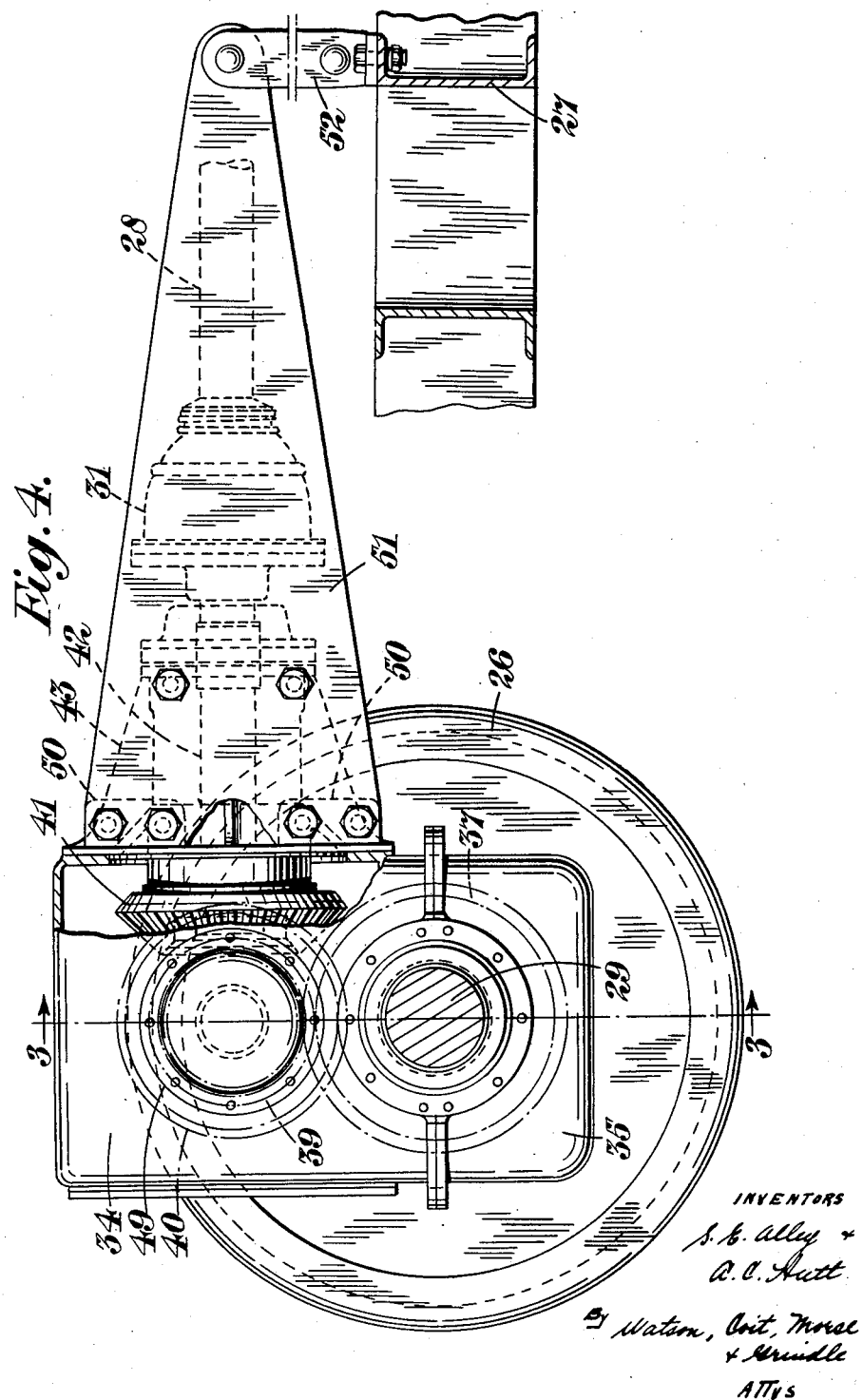

Patented Jan. 14, 1930

1,743,514

UNITED STATES PATENT OFFICE

STEPHEN EVANS ALLEY, OF WESTMINSTER, LONDON, AND ARTHUR CYRIL HUTT, OF SHREWSBURY, ENGLAND, ASSIGNORS TO THE "SENTINEL" WAGON WORKS LIMITED, OF LONDON, ENGLAND, A BRITISH COMPANY

STEAM-DRIVEN VEHICLE

Application filed April 7, 1928, Serial No. 268,268, and in Great Britain July 19, 1927.

This invention is for improvements in or relating to steam-driven vehicles of the kind intended to run on rails, and has for one of its objects to provide an improved construction of such passenger vehicles equipped with bogies which are so driven by propelling machinery on the vehicle as to ensure efficient rail adhesion of the driving wheels. Another object of the invention is to provide an improved arrangement of the propelling machinery on such a vehicle having various advantages over arrangements of such driving plant proposed heretofore.

According to the primary feature of the present invention, a steam-propelled rail vehicle is provided having a bogie frame for certain of its running wheels, which vehicle is characterized in that the steam engine is mounted on the vehicle chassis at or beyond one end of the bogie and is operatively connected by a driving shaft with that runningwheel axle of the latter which is situated furthest away from the engine, which driving shaft is articulated by one or more universal joints whereof one is situated on or near the vertical swivelling axis of the bogie. By this arrangement, the space occupied by the driving plant is reduced without the angle which the driving shaft makes with the running-wheel axle driven thereby exceeding undesirable limits during the swivelling movements of the bogie. Furthermore, it has the advantage of keeping relatively stationary as regards lateral movement that end of the driving shaft which is situated nearest to the engine-driven runningwheel axle of the bogie during turning movements of the vehicle.

According to another feature of the invention, the chassis also carries adjacent to the bogie a steam boiler, and the boiler and steam engine are so disposed that the centre of gravity which their weights have in common is substantially central in relation to the gauge and to the wheel base of the bogie, for the purpose of obtaining effective adhesion of the wheels on the rails without subjecting the vehicle frame to undue stresses that would occur if the weights of the driving plant were not balanced inter se about a point substantially central over the bogie wheel-base and the gauge. The chassis may also carry, adjacent to the bogie, a water tank and a fuel bunker which, together with the boiler and engine, are disposed in the manner, and for the purpose, just stated.

One end of the aforesaid driving shaft may be journalled in a gear box carried by the said running-wheel axle and enclosing spur and bevel toothed wheel gearing whereof one element is mounted on the said shaft. The way in which a gear wheel inside the gear box is mounted on the axle forms a feature of the invention, as does an arrangement, hereinafter described, for ready dismounting of parts of the gearing in the box.

These and other features of the invention will now be described by way of example only with reference to the accompanying drawings.

In these drawings:—

Figure 1 is a side elevation of a rail coach embodying the present invention, the middle portion of the coach being broken away and the figure being partly in vertical section and also having parts of the shell at one end of the coach broken away.

Figure 2 is a plan of the vehicle shown in Figure 1, partly in section on the line 2—2 of Figure 1.

Figure 3 is an end elevation, partly in section on the line 3—3 of Figure 4, showing one axle of the vehicle and certain of the attached parts. This figure is on a scale larger than that of the preceding figures.

Figure 4 is a section on the line 4—4 of Figure 3, further parts being also broken away.

Figure 5 is a plan of some of the parts shown in Figure 4.

Figure 7 is on a scale larger than that of Figure 6.

Like reference numerals indicate like parts throughout the drawings.

Figure 6:
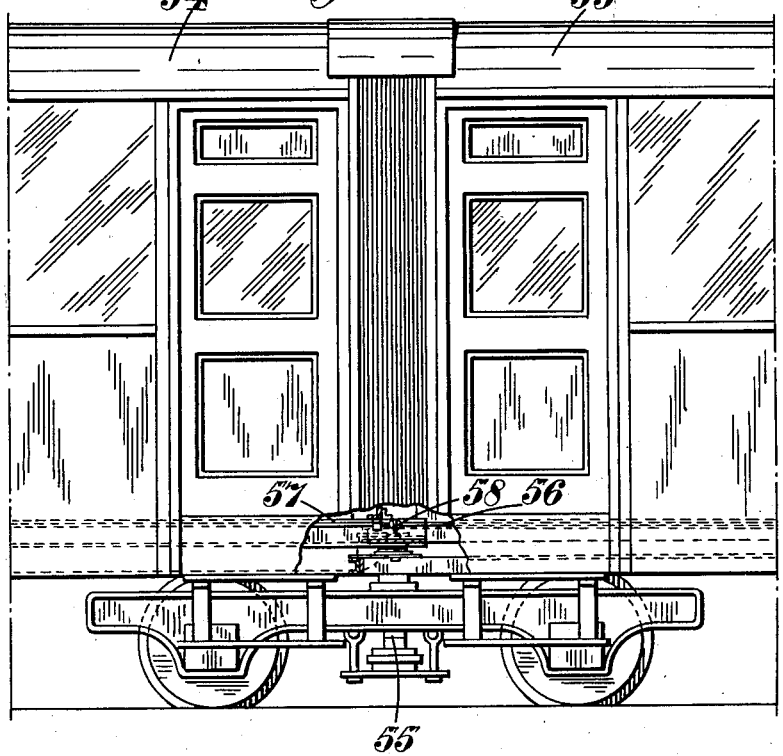
Figure 6 is a side elevation corresponding to Figure 1, but showing a construction in which the ends of two vehicles are supported on a single bogie.

Referring firstly to Figures 1–5, the vehicle illustrated comprises at one end a driver's compartment 10 in which are located the boiler 11 and the fuel and water bunkers 12 and 13. At its other end there is located another driver's compartment 14 to which controls extend from the other end of the vehicle so that the vehicle can be driven from either end. Adjacent to the driver's compartments 10 and 14 are luggage compartments 15 and 16 and between them the passenger portion 17 of the coach. Only a small part of the passenger portion is shown. The bunkers 12 and 13 are arranged in balanced location about the longitudinal centre line of the vehicle and the boiler 11 is located on that centre line. Underneath the chassis, there is mounted a horizontal steam engine 18 which has upstanding brackets 19 and 20 through which are threaded rods 21 carried by brackets 22 and 23 on the chassis frame 24 of the vehicle. Between the brackets 19 and 20 and the rods 21 bushes 25 of rubber or other resilient material are provided so as to limit or prevent the transmission of vibration from the engine to the body of the coach.

The end of the vehicle at which the driver's compartment 10 is located is supported upon running wheels 26 carried by a bogie frame 27. The boiler 11 and the engine 18 are located in balanced relation in respect to the bogie, and the bunkers 12 and 13 are also arranged in balanced relation to the bogie so as to avoid subjecting the chassis to undue stresses.

The engine 18 is connected by a transmission shaft 28 to the axle 29 which is the one remote from it, and the shaft 28 has universal joints 30 and 31 whereof the latter is located near to the vertical swivelling axis of the bogie, for the purpose indicated above. This arrangement enables the engine to be placed nearer to the centre of the bogie than it could be were it arranged to drive the axle 33, so that the space occupied by the driving plant can be reduced without the shaft 28 making too great an angle with the axle 29 when the vehicle is negotiating curves.

The boiler 11 is so located that its internal parts can be lowered without fouling the axle 29, and since the boiler is at the end of the vehicle it will receive ample air supplies while the heat of the boiler will be kept away from the passenger compartment 17. Furthermore, the fire grate of the boiler is readily accessible. The other end of the vehicle is supported upon driving wheels carried by a bogie 32, of which a portion only is shown in the drawings. The vehicle is long and unless care is taken in the arrangement of the load on the bogies there is the possibility of undue stresses being set up in the chassis longitudinals. However, the aforesaid arrangement of the boiler 11, bunkers 12 and 13 and engine 18 will be found to ensure that those parts of the chassis longitudinals situated between the driving plant and the bogie 32 are substantially free from bending stresses due to statistically unbalanced load of the driving plant.

The connection between the transmission shaft 28 and the axle 29 is as follows: Surrounding the middle portion of the axle 29 is a casing composed of two main parts 34 and 35 which are joined together in a horizontal plane of the axle 29, being readily detachably connected together. Inside the casing the axle 29 has an enlarged central portion 36 which is cylinderical and merges into the remainder of the axle by easy curves. Pressed or shrunk on to the enlargement 36 is a spur gear 37 which is of considerable width so that it may have a long life and has the ends of its boss extending beyond the ends of the enlargement 36. Thus, the extremities of the boss do not bear upon portions of the axle, which arrangement minimizes liability of fracture of the axle at the ends of the wheel boss.

In the upper part 34 of the casing there is journalled on roller bearings a lay shaft 38 carrying a spur gear 39 which meshes with the aforesaid gear 36. The shaft 38 also carries a bevel wheel 40 which meshes with a bevel wheel 41 mounted on that part 42 of the transmission shaft 28 which is mounted in a bracket 43 on the casing 34. This arrangement permits of the parts of the transmission from the engine crankshaft to the lay shaft 38 being in alignment and permits the transmission shaft 28 to be disposed horizontally or substantially so. The lay shaft 38 with its wheels 39 and 40 is intended to be readily removable from the casing 34. For this purpose the latter is provided with a detachable plate 44 which covers an aperture large enough to permit the withdrawal of the lay shaft and its gear wheels. This plate 44 carries the roller bearing 45 for the shaft 38, and the other roller bearing 46 is carrier in a bearing 47 formed on the casing 34. Small caps 48 and 49 are provided which permit of access to the bearings when necessary.

The casing 34 is formed with ears 50 to which is bolted a torque member 51, the other end of which is anchored by a link 52 to a part of the bogie frame 27.

Figure 7:
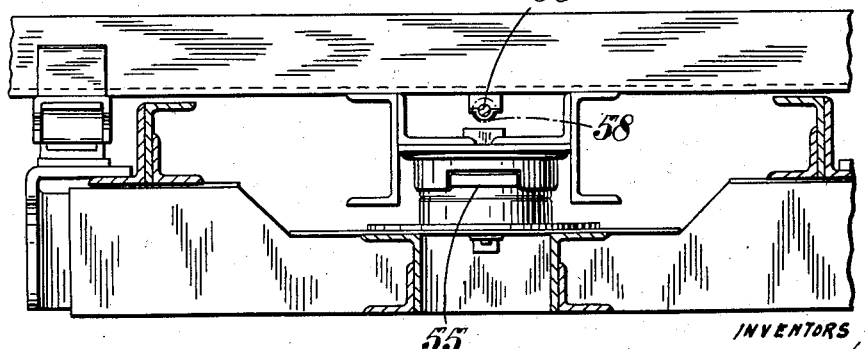
Figure 7 is a detail cross sectional view with certain of the parts shown in Figure 6.

As already mentioned, controls for the driving plant may be situated at both ends of the vehicle. It is also desirable, where the vehicle is joined to another vehicle so as to form a train, that the controls should extend from end to end of the train. Figures 6 and 7 show a construction which may conveniently be adopted when this is to be done. Figure 6 shows the ends of two vehicles 53 and 54 articulated by a bogie pin 55 at their meeting ends. Two portions of the control rods are indicated at 56 and 57, they being jointed together by a universal joint 58 situated over the bogie pin 55. Hence, movements of the vehicles relatively to each other about the axis of the bogie pin will not interfere with the connection of the parts of the control rods together.

Where it is desirable that all the four running wheels 26 should be driving wheels, the axle 33 may be coupled to the axle 29 by side coupling rods, driving chains, toothed wheel gearing or other convenient means. If coupling rods or the like are employed the cranks on the axles 29 and 33, and the coupling rods, are preferably balanced by weights formed by extensions of the crank towards the opposite sides of their respective axes of rotation.

It will be appreciated that the invention provides a steam-driven vehicle which affords effective rail adhesion of the wheels without subjecting the chassis frame of the vehicle to undue stresses to which it would be subjected if the several components of the driving plant were not disposed as described above in such a manner that their weights are balanced inter se about the centre of the bogie. Owing to the very effective rail adhesion the vehicle is adopted to climb gradients which heretofore could not be negotiated by similar vehicles of the class in question equipped with a driving plant of equal capacity carried by the vehicle. Also, owing to the described connection of the crankshaft with the running-wheel axle of the bogie remote from the engine the vehicle is adapted to negotiate sharp curves such as are frequently met with on light railways and in countries overseas. Although any engine which is sufficiently in running balance may be used, it is preferred to use one of the type having six cylinders arranged side by side, and it will be appreciated that the above described location of the engine below the level of the top of the chassis frame permits the whole of the space between the driver's compartments 10 and 14 to be utilized for passenger and luggage accommodation.

It is to be understood that the invention is not restricted to the precise constructional details set forth. For instance, the transmission system between the engine and the axle 29 may include a variable speed gear.

We claim:—

1. The combination of an axle formed with an enlargement constituting a seating, and a gear wheel contracted onto said seating, which gear wheel is of such dimensions and shape as to extend beyond the seating and overhang, but not engage, a reduced portion of the axle adjacent to the seating.

2. A steam-propelled rail vehicle comprising the combination with the vehicle chassis, of a bogie for certain of the running wheels, a steam engine carried by the chassis at one end of the bogie, a driving shaft operatively connecting the engine with that running wheel axle of the bogie which is situated furthest away from the engine, the said operative connection including a lay shaft, gear wheels carried thereon, and a gear box carried by the said running-wheel axle, enclosing the lay shaft and gear wheels, and affording a journal bearing for one end of the driving shaft, said gear box embodying a detachable portion which affords a bearing for one end of the lay shaft and is of such dimensions that when removed it uncovers an aperture large enough to permit the withdrawal of the lay shaft and its gear wheels from the interior of the box, and said driving shaft embodying a universal joint situated close to the vertical swivelling axis of the bogie, for the purpose specified.

3. A steam-propelled rail vehicle comprising the combination with the vehicle chassis, of a bogie for certain of the running wheels, a steam engine, brackets thereon, rods on the chassis at one end of the bogie, which rods are threaded through said brackets, resilient bushes interposed between the rods and the brackets, and a driving shaft operatively connecting the engine with that running-wheel axle of the bogie which is situated furthest away from the engine, which driving shaft is articulated and has a universal joint situated close to the vertical swivelling axis of the bogie, for the purpose specified.

4. A train comprising a steam-propelled rail vehicle having in combination a vehicle chassis, a bogie for certain of the running wheels, a steam engine carried by the chassis at one end of the bogie, and a driving shaft operatively connecting the engine with that running-wheel axle of the bogie which is situated furthest away from the engine, which driving shaft is articulated and has a universal joint situated close to the vertical swivelling axis of the bogie, a second vehicle, engine controls therein, a pin constituting an articulated connection between the two vehicles, and rods extending from the said controls to the engine in the first named vehicle, which rods embody an articulated connection located above the said pin, for the purpose specified.

5. A steam propelled rail vehicle comprising a combination with the vehicle chassis, of a bogie for certain of the running wheels, a steam engine carried by the chassis at one end of the bogie a driving shaft operatively connecting the engine with that running wheel axle of the bogie which is situated furthest away from the engine, said shaft embodying a universal joint situated close to the verticle swivelling axis of the bogie, toothed wheel gearing operatively connecting the driving shaft to the axle whereof one element is mounted on said shaft and another is mounted on an enlargement on said running wheel axle in such manner as to overhang but not engage the reduced portion of the axle adjacent to the enlargement.

In testimony whereof we have signed our names to this specification.

STEPHEN EVANS ALLEY.
ARTHUR CYRIL HUTT.